US006347776B1

United States Patent
Chuang

(10) Patent No.: US 6,347,776 B1
(45) Date of Patent: Feb. 19, 2002

(54) MULTI-DIRECTIONAL MOUNTING BRACKET

(76) Inventor: Po-An Chuang, 12F-2, No. 376, Tun Hwa South Road, Sec. 1, Taipei (TW)

( * ) Notice: Subject to any disclaimer, the term of this patent is extended or adjusted under 35 U.S.C. 154(b) by 0 days.

(21) Appl. No.: 09/610,547

(22) Filed: Jun. 30, 2000

(51) Int. Cl.[7] .................................................. A47F 5/00
(52) U.S. Cl. ............................. 248/288.51; 248/299.1; 403/114
(58) Field of Search .................. 248/288.31, 288.51, 248/535, 207, 299.1; 403/116, 115, 114, 21, 22

(56) References Cited

U.S. PATENT DOCUMENTS

| | | | |
|---|---|---|---|
| 325,352 A | * | 9/1885 | McKay |
| 1,086,375 A | * | 2/1914 | LaFrance |
| 1,386,959 A | * | 8/1921 | Severance et al. |
| 1,573,272 A | * | 2/1926 | Phillips |
| 3,661,376 A | | 5/1972 | Hill et al. |
| 3,752,258 A | | 8/1973 | Ishikawa |
| 3,851,979 A | * | 12/1974 | Becker .................. 403/115 X |
| 4,547,092 A | | 10/1985 | Vetter et al. |
| 4,758,109 A | * | 7/1988 | Little et al. ............... 403/21 X |
| 4,765,580 A | | 8/1988 | Wright |
| 4,984,278 A | | 1/1991 | Frye et al. |
| 5,118,058 A | | 6/1992 | Richter |
| 5,201,896 A | | 4/1993 | Kruszewski |
| D362,253 S | | 9/1995 | Vogels |
| D395,892 S | | 7/1998 | Solomon |
| D406,144 S | | 2/1999 | Vogels |
| 6,220,556 B1 | * | 4/2001 | Sohrt et al. ......... 248/288.31 X |

* cited by examiner

Primary Examiner—Ramon O. Ramirez
Assistant Examiner—Korie H. Chan
(74) Attorney, Agent, or Firm—Dougherty & Troxell

(57) ABSTRACT

A multi-directional mounting bracket for adjustably mounting an article, such as an audio speaker or light fixture, to a surface includes a first mounting member (10) for attachment of the bracket to the surface. A spherical housing (14) is connected to the first mounting member (10), and a receiving socket (20) is selectively mountable to the spherical housing (14) by engagement of a fastener (22) to the spherical housing (14). The receiving socket (20) is connected to a second mounting member (18) for attachment to the article. The receiving socket (20) is selectively mountable along a spherical orbit of the spherical housing (14), and thus provides a greater range of adjustment and positioning of the article with respect to the surface to which it is attached.

4 Claims, 2 Drawing Sheets

MULTI-DIRECTIONAL MOUNTING BRACKET

FIELD OF THE INVENTION

The present invention relates generally to mounting brackets and more particularly to a mounting bracket which may be adjusted along multiple planes of a spherical orbit of adjustment, and may be selectively retained in various positions by tightening of a single fastener. This invention may have applications that allow an article, such as an audio speaker or light fixture, to be mounted in a wide variety of positions, such that the article is directed towards a specific point.

BACKGROUND OF INVENTION

Mounting brackets having multiple axes of adjustment are well known in the prior art. Such devices permit a range of articles to be adjustably mounted to walls, ceilings, shelves, floors, and other surfaces. Such brackets have been designed with one or more joints to allow an article to be mounted in a desired position or orientation, in reference to the surface to which it is mounted. Such brackets are useful in mounting audio speakers, directional lighting, or any other article requiring adjustable and directional positioning relative to a surface.

Various mounting brackets have been invented, and can be grouped into two general types: planar adjustable mounting brackets of the type described in "Universal Audio Speaker Mounting Bracket," U.S. Pat. No. : 5,201,896 issued to Kruszewski; and spherically adjustable mounting brackets of the type described in "Loudspeaker Support," U.S. Pat. No. : 4,765,580 issued to Wright.

The problems associated with mounting brackets of the planar variety are that they are typically limited to two axes of adjustment, wherein multiple joints are required to be oppositely opposed to one another. This creates a bulky and obtrusive device having a limited range of adjustment along a limited number of planes.

Spherically adjustable mounting brackets allow for adjustment along multiple planes by means of a ball and socket joint. In the typical design, a ball is mounted within a stationary socket. The socket is required to envelope a majority of the ball so that the article may be mounted securely by a pressure force locking mechanism, such that the article does not easily come loose from its fixed position. Although this configuration allows an article to be mounted along multiple plans, the range of adjustment afforded by this design is substantially restricted by the fact that the socket is required to envelope a significant portion of the stationary ball. Envelopment of the ball by the socket is the means by which the ball is secured. Typically, the range of adjustment is less than 180 degrees along a given plane.

It is therefore desirable to provide a new mounting bracket for adjustably mounting an article to a surface that overcomes the problems and restricted movement of similar devices in the prior art. It is also desirable to provide a mounting bracket that can be used to adjustably mount a variety of articles, including but not limited to audio speakers, light fixtures, and other devices requiring adjustable and directional mounting about a wide range of adjustment along multiple planes. There is also a need to provide an adjustable and directional mounting bracket that can be mounted to a number of support surfaces, despite the orientation of the support surface. Finally, it would also be desirable to provide a mounting bracket that allows a single user to easily adjust the positioning of the article.

The aforementioned background has outlined some of the more pertinent objects of the present invention. These objects should be construed to be merely illustrative of some of the more pertinent features and applications of the invention. Many other beneficial results can be attained by applying the disclosed invention in a different manner or modifying the invention as will be described. Accordingly, other objects and a fuller understanding of the invention may be had by referring to the following illustrations, and the written disclosure of the Detailed Description of the Invention.

SUMMARY OF THE INVENTION

The present invention is a multi-directional mounting bracket for adjustably mounting an article, such as a speaker or light fixture, to a surface. It is to be understood that the mounting bracket described herein may be utilized to mount any article wherein it would be advantageous to position the article in multiple adjustable positions.

The mounting bracket of the present invention includes a stationary spherical housing mountable to a support surface, such as a wall, ceiling, shelf, or similar surface. A receiving socket is rotatably attachable to the spherical housing on multiple axes, such that a mounting member, for mounting an article to the bracket, can be engaged with the receiving socket on multiple planes in relation to the surface to which the bracket is mounted.

An article, such as an audio speaker or lighting fixture, is removably attachable to the mounting member of the mounting bracket. The mounting member is of a symmetrical shape, such that the article can be mounted to the mounting member in any direction, thus increasing the range of mounting options available. A fastening device is utilized to secure the receiving socket to the spherical housing, such that the receiving socket can be easily and adjustably attached about the housing in virtually any position. The range of adjustment would only be limited by the positioning of the support surface mounting member of the spherical housing.

In a preferred embodiment, the spherical housing is mounted to a surface by means of a device known as a first mounting member. The first mounting member is secured to the surface by a plurality of screws, or similar types of fasteners. The spherical housing is engaged to the first mounting member in a fixed position, such that it creates a stable base for mounting the article.

Another mounting member is rotatably and adjustably attachable to the spherical housing by means of a slotted receiving socket, which is mounted to the spherical housing by means of a fastener. The desired article, such as an audio speaker or light fixture, is attachable to this second mounting member. The fastener is used to secure the receiving socket to the spherical housing, and is attachable to the spherical housing in two positions that are juxtaposed 90 degrees to one another. This juxtaposition allows the receiving socket to be mounted in two arrangements, that when combined allow the second mounting member and article to be positioned along all spherical planes of the spherical housing.

Preferably, the receiving socket envelopes less than 50% of the spherical housing, permitting a range of adjustment along 360 degrees of all spherical planes of the spherical housing, limited only by the positioning of the first mounting member. This range of adjustment is far greater than other mounting brackets known in the art.

The second mounting member is of a symmetrical planar shape that corresponds to the shape of the attachment means on the article to be mounted, such that the article may be attached to the mounting member in any direction, along the plane of the mounting member. Thus an added range of adjustment is utilized.

The spherical housing may be attached to the first mounting member substantially towards one end of the first mounting member. This end of the mounting member is installed towards the portion of a vertical surface closest to the ground or the floor. Thus the gravitational force exerted on the mounting member is greater towards the upper portion of the mounting member, which in this embodiment has more means of attachment than the lower portion. Fewer means of attachment are thus required on the lower portion of the mounting member, thereby creating a more aesthetically pleasing appearance.

The foregoing has outlined some of the more pertinent objects of the present invention. These objects should be construed to be merely illustrative of some of the more prominent features and applications of the invention. Many other beneficial results can be attained by applying the disclosed invention in a different manner or by modifying the invention as will be described. Accordingly, other objects and a fuller understanding of the invention may be had by referring to the following Detailed Description of the Invention, which includes the preferred embodiment.

BRIEF DESCRIPTION OF THE DRAWINGS

These and other features and advantages of the invention will now be described with reference to the drawings of certain preferred embodiments, which are intended to illustrate and not to limit the invention, and in which.

DETAILED DESCRIPTION OF THE INVENTION

The present invention is a multi-directional mounting bracket for mounting an article, such as an audio speaker or light fixture, to a surface such that the article may be positioned along multiple planes of a spherical orbit of adjustment.

Figure 1:
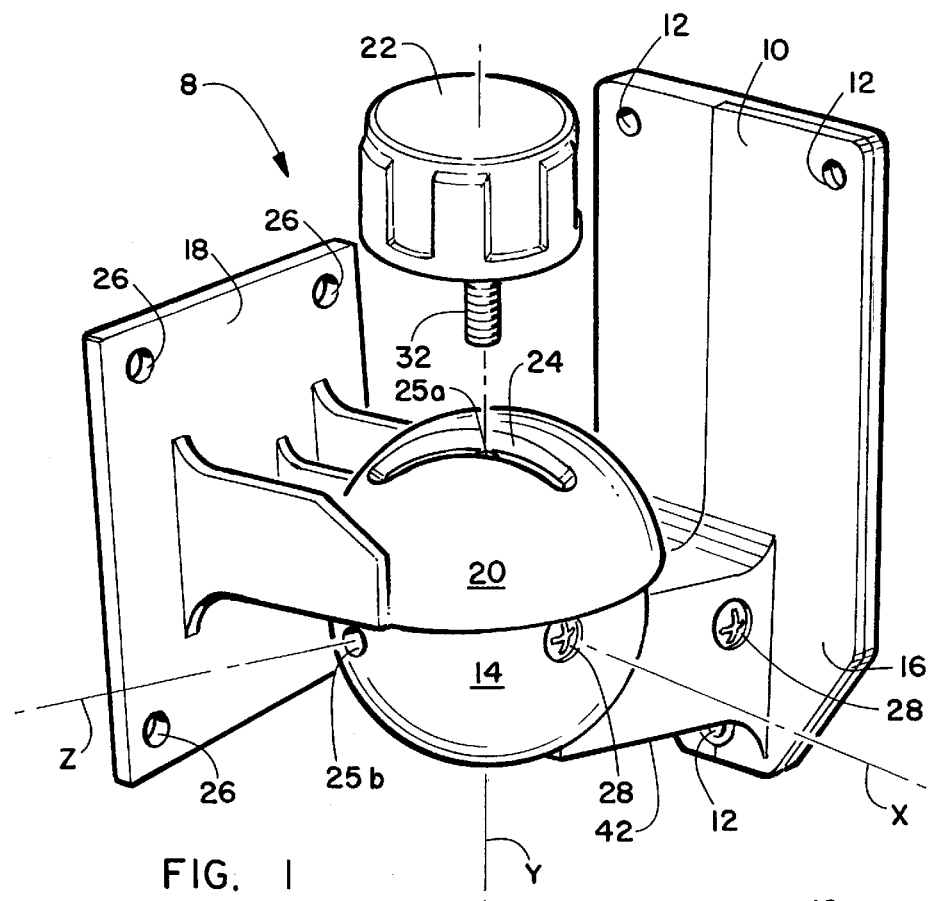
FIG. 1 is a perspective view of a multi-directional mounting bracket constructed in accordance with the teachings of the present invention.
Figure 2:
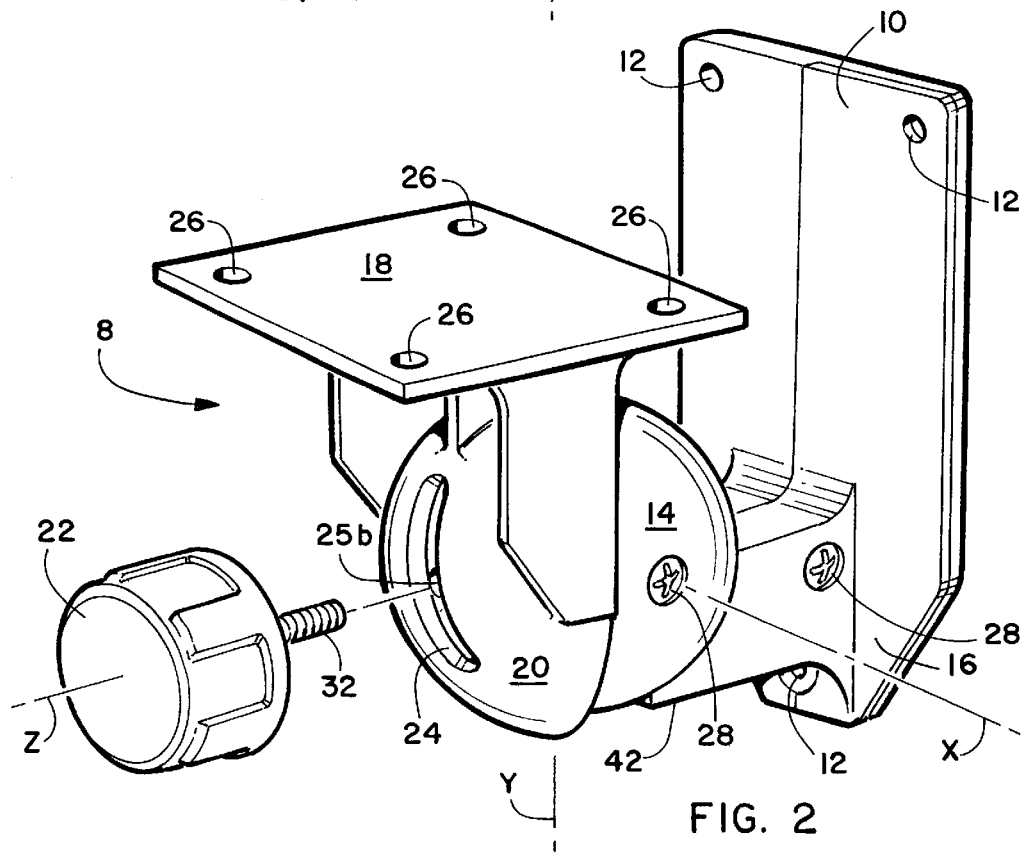
FIG. 2 is a perspective view of an alternate positioning arrangement of the present invention.

Referring now to the drawings, and to FIGS. 1 and 2 in particular, there is illustrated a perspective view of two positioning arrangements of the mounting bracket 8. These are merely two examples of the myriad of mounting positions afforded by the present invention. In a preferred embodiment, the bracket 8 of the present invention is mounted to a surface by means of a first mounting member 10. Multiple perforations 12, preferably three, are configured to receive suitable fastening means, such as screws or nails, for fastening the mounting member 10 to a wall or other surface.

A spherical housing 14 is engaged with the first mounting member 10, by an appendage 42 projecting from the spherical housing 14 towards a lower portion 16 of the first mounting member 10. In the preferred embodiment, the appendage 42 is integrally formed with the spherical housing 14 and the lower portion 16 of the first mounting member 10. A second mounting member 18 is rotatably and adjustably attachable to the spherical housing 14 by means of a receiving socket 20. Multiple through bores 26, preferably four, provide a means for fastening an article (not shown) to the second mounting member 18 by means of a screw or similar piece of hardware fastening device. The second mounting member 18 is of a symmetrical planar shape, such that the article may be attached to the mounting member 18 in any direction, along the plane of the mounting member 18. It is to be understood, however, that the second mounting member 18 may be one of any number of shapes that correspond to the shape of the mounting portion of the article to be mounted to the bracket 8.

The receiving socket 20 is engaged in an adjustably locked position to the spherical housing 14 by means of a fastener 22. The fastener 22 includes a threaded protrusion 32, such as a bolt, that passes through a slot 24 in the receiving socket 20 and a perforation 25a,b in the spherical housing 14 to engage a receptor 30 (illustrated in FIG. 3). When the fastener 22 is loosened, the receiving socket 20 may be adjusted about the spherical housing 14. The fastener 22 is tightened to lock the receiving socket 20 to the spherical housing 14, so as to allow the second mounting member 18, and the corresponding article, to be positioned about a spherical orbit of the housing 14.

The configuration of the present invention illustrated in FIGS. 1 and 2 allow an article to be positioned at virtually any point along a 360 degree angle about a spherical orbit. The only restriction as to the mounting location about the orbit is the location of the means to which the bracket is mounted to the surface. The positioning of the receptors 30, preferably two (shown in FIG. 3) at 90 degrees to one another, allows the fastener 22 to engage the spherical housing 14 in two different locations, positioned at the perforations 25a,b. Consequently, the receiving socket can be rotated about two separate axes of adjustment, illustrated as "Y" and "Z" respectively. It is to be understood that the axes of adjustment indicated herewith are for means of illustration only, and are not intended to limit the positioning of the perforations 25a,b. However, the broad range of adjustment afforded by the present invention is possible by positioning the fastener 22 along the "Y" axis or "Z" axis respectively. When the fastener 22 engages the spherical housing 14 at the perforation 25a located along the "Y" axis, the receiving socket 20 may be simultaneously rotated about the "Y" axis, while also being angled along an axis that extends from the origin of the X,Y,Z axes to any point in the X, Z plane. Also, when the fastener 22 engages the spherical housing 14 at the perforation 25b located along the "Z" axis, the receiving socket 20 may be simultaneously rotated about the "Z" axis, while also being angled along an axis that extends from the origin of the X,Y,Z axes to any point in the X,Y plane. The angle of adjustment, created when the fastener is positioned along the "Y" axis, is limited only by the length of the slot 24 in the receiving socket 20 and the obstruction created by the appendage 42 projecting from the spherical housing 14 to the first mounting member 10. The angle of adjustment, created when the fastener 22 is positioned along the "Z" axis, is limited only by the length of the slot 24 in the receiving socket 20 and the obstruction created when the second mounting member 18 is impeded by the first mounting member 10.

Figure 3:
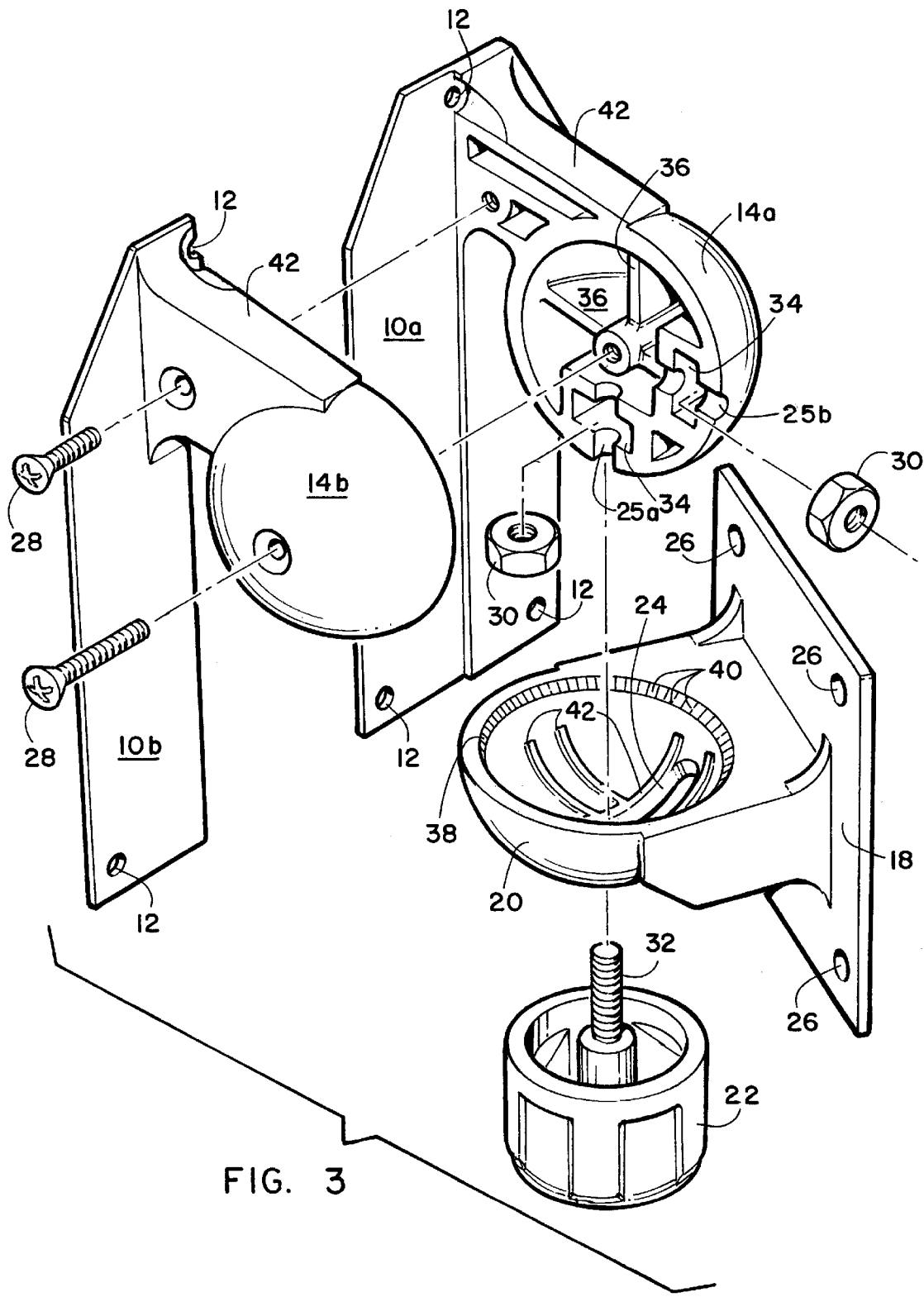
FIG. 3 is an exploded view of the present invention illustrating the components of the mounting bracket.

Referring now to FIG. 3, an exploded view of the invention is shown wherein the first mounting member 10 is comprised of two securable mounting halves 10a and 10b. The securable halves 10a and 10b are integrally formed with two spherical housing halves 14a and 14b by means of an appendage 42. In the preferred embodiment, the mounting halves 10a and 10b are secured by fasteners, such as screws 28. However, it is to be understood that other means well known in the art may be utilized to secure the halves, including glue or other adhesives. The mounting half 10*b* fits into a recess of mounting half 10*a,* such that when combined, form a flush surface on the mounting member 10.

Within the spherical housing 14, are housed two receptors 30, such as metal nuts. The receptors 30 are threaded to receive the fastener 22 which includes a threaded metal protrusion 32, such as a bolt. The combination of the fastener 22, threaded protrusion 32, and receptors 30 comprise a male to female connecting apparatus that secures the receiving socket 20 to the spherical housing 14 in locking engagement. Other connecting devices known in the art that form a male to female connection may also be utilized. The receptors 30 are secured within the spherical housing 14 by means of support collars 34, which are integrally formed within the spherical housing 14. Additionally, support arms 36, are integrally formed with the spherical housing 14 and the support collars 34, so as to provide a means for resisting the pressures exerted on the spherical housing 14 by the receiving socket 20 when the fastener 22 is tightened. The support arms 36 provide resistance to the pressures exerted on the spherical housing 14 as the receiving socket 20 is locked into place by the fastener 22.

The receiving socket 20 is integrally formed with the second mounting member 18 to provide a stable mounting surface for the article to be mounted. Within the receiving socket 20 is formed a serrated ring 38 having multiple contact teeth 40. The contact teeth 40 form contact points with the spherical housing 14 and provide for ease of adjustment and added gripping strength of the receiving socket 20 about the spherical housing 14. Additionally, the serrated ring 38 forms the inner diameter of the receiving socket 20. Preferably, the inner diameter of the receiving socket 20 is at least about 5% smaller than the outer diameter of the spherical housing 14. This results in the receiving socket 14 enveloping less than about 50% of the spherical housing 14, thus permitting a range of adjustment along 360 degrees of all spherical planes of the spherical housing 14. Multiple ridges 42 are also formed within the receiving socket 20 so as to provide added support to the receiving socket 20 as the fastener 22 is tightened to the spherical housing 14.

In summary, there has been disclosed a unique multi-directional mounting bracket for mounting an article, such as an audio speaker or a light fixture, to a surface. The mounting bracket is capable of mounting an article at virtually any point along a 360 degree angle about a spherical orbit. The only restriction as to the mounting location about the orbit is the location of the means to which the bracket is mounted to the surface. The present invention may be constructed in different variations to provide varying means of attachment to a surface, thereby expanding the available angles and axes of adjustment of the article to be mounted. Additionally, the present invention may be constructed of various types of materials that allow for inexpensive and mass reproduction, and consistency of manufacture so that parts may be interchanged. Although plastic is utilized in the preferred embodiment for the bracket components, and metal is used for the fastening devices, other materials well known in the art may also be used.

Having described the preferred embodiment for the apparatus of the present invention, it will be apparent to one skilled in the art that other embodiments are also easily adapted by using the concepts discussed above. Accordingly, the invention should be limited only by the spirit and scope of the appended claims.

I claim:

1. The multi-directional mounting bracket for adjustably mounting an article to a surface comprising:

a spherical housing having an appendage for mounting the housing a distance from a surface;

a receiving socket adjustably mounted to the spherical housing;

a means for attachment of an article to the receiving socket; and wherein at least two receptors are juxtapositioned within the spherical housing at a 90° angle from the center of the spherical housing, for selective mounting of the receiving socket about the spherical housing.

2. A multi-directional mounting bracket for adjustably mounting an article to a surface, comprising:

a spherical housing having an appendage for mounting the housing to a support surface;

a slotted receiving socket being rotatable and adjustably mounted to the spherical housing, and having a mounting member for attaching an article;

a fastener passing the slot of receiving socket and locking the receiving socket to the spherical housing; and at least two receptors disposed on the spherical housing at different positions for engaging with the fastener wherein the receiving socket is in locking engagement with the spherical housing in selective one of at least two positions.

3. The multi-directional mounting bracket of claim 2 wherein said two receptors are juxtapositioned within the spherical housing at about a 90° angle from the center of the spherical housing.

4. The multi-directional mounting bracket of claim 2 wherein the fastener has a threaded protrusion, and receptors comprise a male to female connecting apparatus.

* * * * *